United States Patent [19]
Frey

[11] Patent Number: 5,848,128
[45] Date of Patent: Dec. 8, 1998

[54] TELECOMMUNICATIONS CALL PRESERVATION IN THE PRESENCE OF CONTROL FAILURE

[75] Inventor: Alan Eugene Frey, Naperville, Ill.

[73] Assignee: Lucent Technologies Inc., Murray Hill, N.J.

[21] Appl. No.: 609,160

[22] Filed: Feb. 29, 1996

[51] Int. Cl.[6] .......................... H04M 1/24; H04M 15/00; G06F 11/00; H04J 1/16
[52] U.S. Cl. .............................. 379/9; 379/112; 379/207; 379/220; 379/230; 395/182.04; 395/182.09; 370/217
[58] Field of Search .................................. 379/1, 2, 9–18, 379/32, 34, 112, 207, 210–212, 217, 220, 221, 222, 230; 370/216, 217, 218, 219, 220, 221; 395/181, 182.04, 182.08, 182.09, 182.11, 182.13

[56] References Cited

U.S. PATENT DOCUMENTS

| | | | |
|---|---|---|---|
| 4,914,572 | 4/1990 | Bitzinger et al. | 379/10 |
| 4,949,373 | 8/1990 | Baker, Jr. et al. | 379/212 |
| 5,182,750 | 1/1993 | Bales et al. | 379/221 |
| 5,661,719 | 8/1997 | Townsend et al. | 370/221 |

OTHER PUBLICATIONS

K.P. Birnami: The Process Group Approach to Reliable Distributed Computing; Communications of the ACM, Dec. 1993, v. 36, No. 12, pp. 37–54.

*Primary Examiner*—Paul Loomis

[57] ABSTRACT

This invention relates to methods and apparatus for continuing the processing of a telecommunications call in the presence of a failure of a call processor. A backup processor is designated for each call, and a file of signaling messages for that call is maintained in that backup processor. When a failure of the call processor is detected, the file of accumulated messages for the call is processed by the backup processor in order to build up a call state for the call, but without sending call control messages for the call. Subsequent signaling messages are processed by the backup processor, including transmitting call control messages to other processors for establishing the call. Advantageously, the backup processor only processes signaling messages when a failure is detected thus greatly reducing the processing resources required for a typical call (which, of course, does not involve a processor failure).

32 Claims, 4 Drawing Sheets

TELECOMMUNICATIONS CALL PRESERVATION IN THE PRESENCE OF CONTROL FAILURE

Related Application

This application is related to T. W. Anderson et al.: "Control of Telecommunications Networks" being filed concurrently and being assigned to the assignee of this application.

1. Technical Field

This invention relates to call processing in telecommunication networks.

2. Problem

In stored program controlled telecommunications networks and switching systems, control of all calls is concentrated in a relatively small number of program controlled processors. If any these processors fail or are otherwise out of service, a large number of telephone calls are adversely affected. At the same time, telephone administrations and telephone operating companies are demanding networks and switching systems that are capable of offering service with fewer and fewer imperfectly handled calls.

Not all failures are equipment failures. The software for controlling modern telecommunications networks is very complex and frequently changed. If new software is introduced, there is a significant probability that at least some types of telephone calls will not be properly served by this new software, even if these same calls had been properly served by a previous version of the control software. Also, processors may be unavailable because they are taken out of service for routine maintenance.

In a related application being submitted at the same time as this application, a new control configuration is being proposed which protects against equipment failures of control processors. That arrangement protects against the loss of a large number of telephone calls arriving after a control processor failure. It does not save calls which are in progress but have not yet been established. The call failure rate demands of present telephone administrations and operating companies are such that the number of calls which could be expected to be lost from equipment failures of processors would exceed the allowable number of lost calls if switching systems could not recover calls in the process of being established. A problem of the prior art, therefore, is that there is no efficient, satisfactory arrangement for meeting the rigorous demands for very low call failure rates demanded by present day telephone administrations and operating companies.

3. Solution

The above problem is solved, and an advance is made over the teachings of the prior art, in accordance with the principles of this invention wherein signaling messages for a call are stored in another processor as well as the serving processor; subsequently, when the serving processor fails, (the failure can be in software or hardware), a backup processor processes the stored signaling messages, in order to build up a call state, and then continues processing the call until the call is established.

In accordance with one preferred embodiment, signaling messages are transmitted to a call processor for serving the call, and this call processor then transmits a copy of the signaling message to a backup processor. When the backup processor is called into service because of a failure in software or hardware by the original serving call processor, the backup processor processes all previous messages in order establish a call state for the call and then proceeds from that call state to continue serving that call until the call is established. Advantageously, only call message data is transmitted to the backup call processor thereby avoiding a large amount of additional transmission of call state information for the large percentage of calls which are successfully completed without resorting to a backup processor. Advantageously, if the backup processor contains an earlier software version, that processor will then be able to serve a call which a processor controlled by the latest software version does not serve properly.

In accordance with one preferred embodiment, all processors are part of a control complex (a switching processing platform) separate from the switching systems (switches) of a telecommunications network. Any call processor in any control complex is able to control a call in any of the switches of the network. The control complexes are connected to the switches via a high speed signaling network, an asynchronous transfer mode (ATM) network in applicant's preferred embodiment, so that control signals for controlling the operation of the switching systems are transmitted to these switching systems very rapidly. The control complex includes a signaling link processor which transmits signaling messages received from a signaling system 7(SS7) signaling network to the call processor serving the call. The SS7 protocol requires that the receipt of a message be acknowledged; in accordance with the preferred embodiment, there is a further requirement that completion of processing of a message be further acknowledged. The signaling link processor monitors call processors for failures and for failure to acknowledge the proper processing of a message received from the signaling link processor. In either of these situations, the signaling link processor reassigns control of the call to a backup processor which backup processor has received copies of earlier messages received by the original call processor. The backup call processor then processes these earlier messages received and processed by the original call processor, in order to reconstruct the appropriate call state for the call, so that from this call state it can properly process the next newly received message and subsequent messages.

In one alternative embodiment, the signaling link processor stores the signaling messages for a call and initializes the backup processor with these messages in case of a failure. Advantageously, this arrangement minimizes extra transmission of signaling messages. A disadvantage is that customer dialed inputs, especially those that are detected after initial dialing is complete, may not come through the signaling link processor and would be ignored, but such inputs would be stored and processed if the backup processor approach were used.

DETAILED DESCRIPTION

Figure 1:
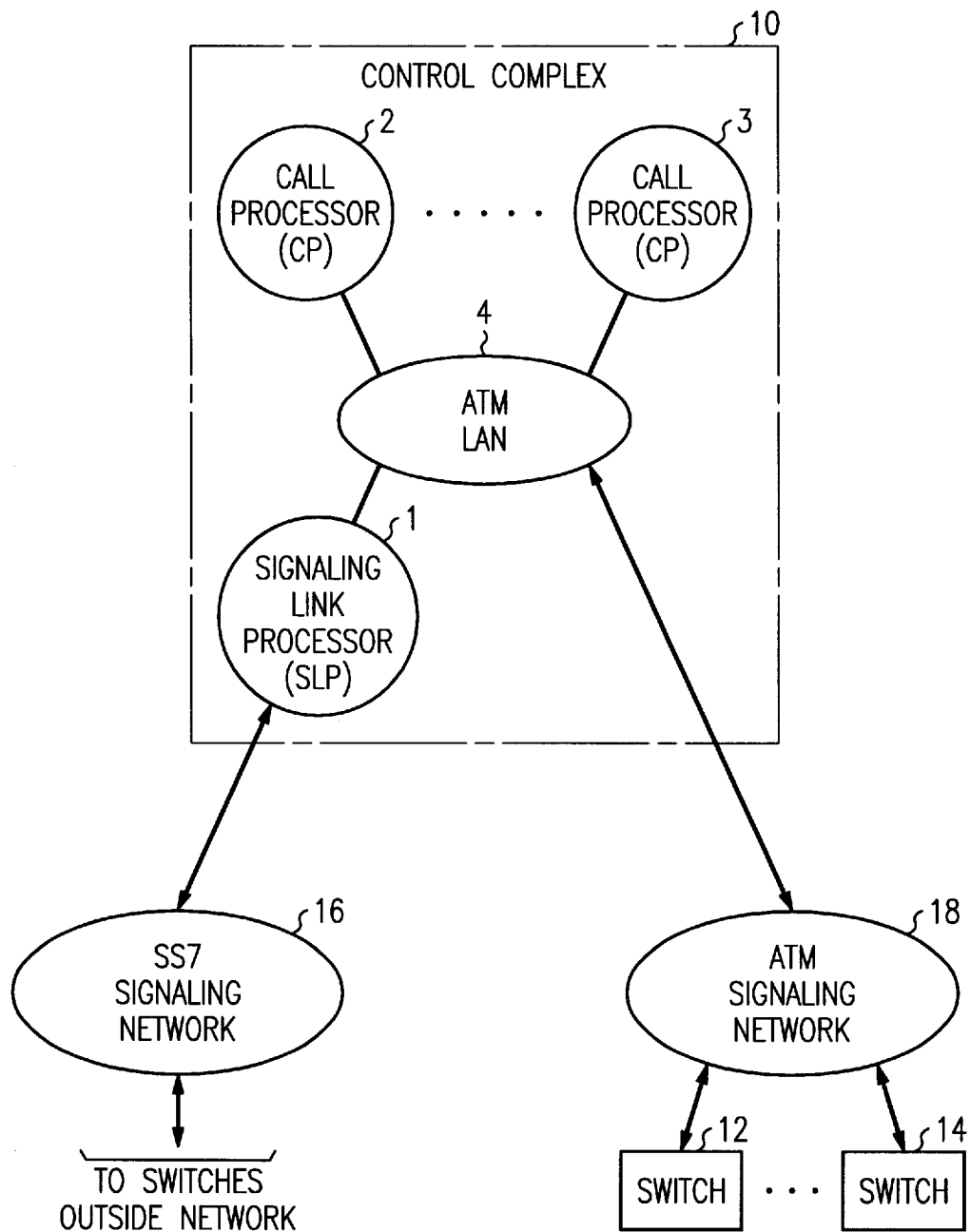
FIG. 1 is a block diagram illustrating a network for use with applicant's invention.

FIG. 1 is a block diagram of the control arrangement used in applicant's preferred embodiment. The control complex 10, a switching processing platform, is described in more detail in the related application being filed concurrently herewith. Control for the telecommunications network resides in a plurality of control complexes 10, one of which is shown in the block diagram. The control complex includes a signaling link processor 1, two (and generally more) call processors 2 and 3, an ATM local area network (ATM/LAN) 4 for interconnecting the processors 1, 2, and 3, and for connecting them to an ATM signaling network 18 for transmitting signals to and receiving signals from other control complexes and switches 12, . . . , 14 of the telecommunications network. Other processors (not shown) of the control complex 10 are also connected to ATM/LAN 4, but are not pertinent to the principles of this invention. ATM signaling network 18 transmits signals among the switches and to the control complex and SS7 network transmits signals to and receives signals from switches outside the network.

Figure 2:
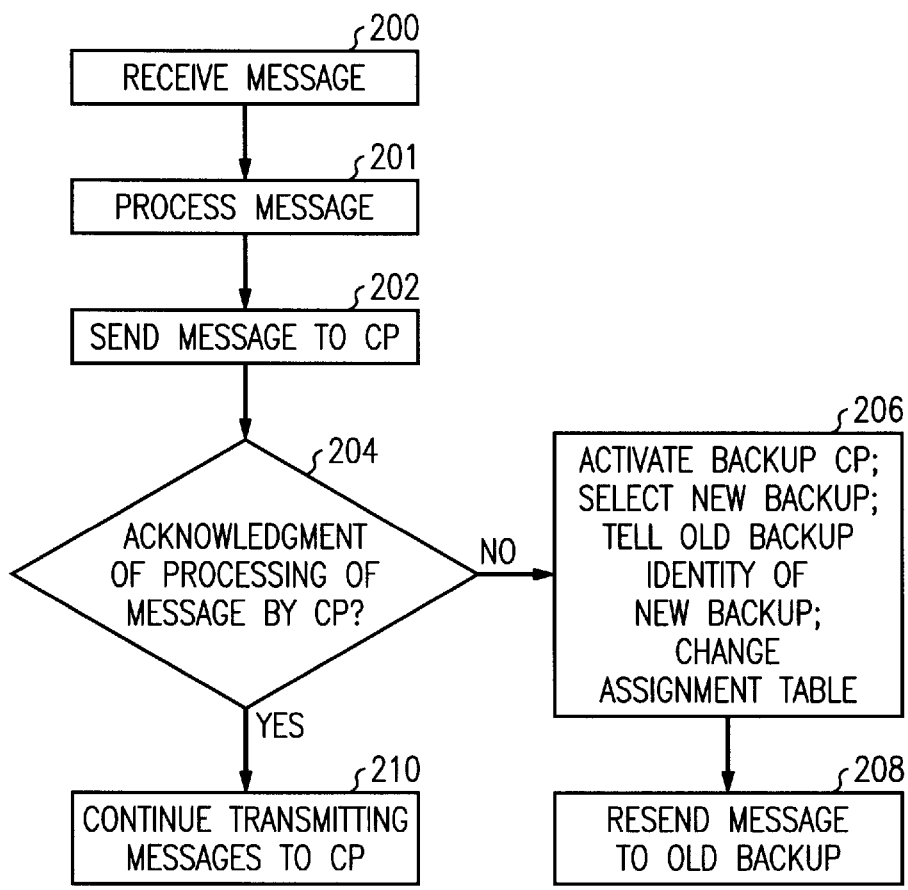
FIG. 2–6 are flow diagrams of actions performed by various processors to implement applicant's invention.
Figure 3:
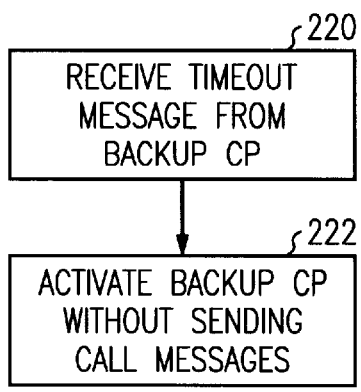
Figure 4:
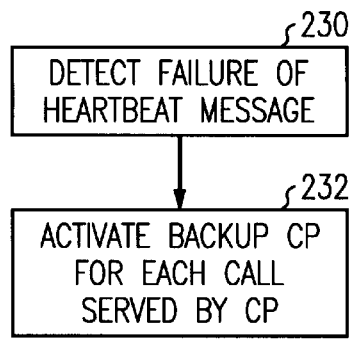

FIGS. 2–4 are flow diagrams illustrating the pertinent segments of the operation of the signaling link processor (SLP) 1. In FIG. 2, this processor receives a message (action block 200), and processes the message (action block 201). Processing the message includes a test of whether the message is an initial address message. The SLP maintains a table relating trunks to call processors so that messages, which are identified by the trunk to which the message pertains, can be routed to the correct call processor. This call processor has been selected and its identity is obtained from a table relating a trunk of the call to a message. If the message is an initial address message (IAM), the call processor and a backup processor are selected at the time of the reception of the IAM. In general, the selection is performed to balance the load among call processors, or to select processor for a particular type of call, e.g., an 800 call, not served by all processors. In addition, the signaling link processor keeps track of which processors have been determined to be defective and steers all calls away from these processors. In this particular example, a call is being served by call processor 2 and call processor 3 is acting as a backup for serving the call in case of a failure in processor 2. A plurality of processors serve as backups for different calls served by one call processor, so that in the event of a failure of that call processor, all the burden is not placed on a single backup call processor. Following the processing of the message, the message is sent to the serving processor (action block 202).

Subsequently, test 204 determines whether an acknowledgement of the message transmitted to the call processor is received within a specified time. If so, then the SLP can continue to transmit messages for that call to the serving call processor (action block 210). If no acknowledgement is received, then the backup processor is activated for that call (action block 206). A backup processor is activated for all calls served by a particular processor in case a signaling link processor fails to receive a heart beat message from that processor, indicating a gross failure. However, a failure of acknowledgement may represent a software failure for a particular type of call, therefore all calls need not be switched to a backup processor. A signaling link processor also checks at the time of action block 206 to see whether a backup had previously been activated for that call and for that particular message; in the latter case, the call is dropped since other attempts to process that message are likely to be futile. After activating the backup call processor, the message most recently received for the call is sent from the SLP to the backup (action block 208) and call processing proceeds.

FIG. 3 illustrates actions performed by the SLP in case a timeout message is sent from the backup processor (action block 220). In that case, the backup processor is activated for that call (action block 222), and the original serving processor is deactivated; in this case no call message is sent from the SLP to the backup processor, because it is assumed that the call processor had already sent the most recent call message.

FIG. 4 illustrates actions performed by the SLP in case of a failure to receive heartbeat messages from a call processor. Heartbeat messages are sent periodically, usually following some test or audit procedure, to assure the SLP that the call processor is still operational. If a failure to receive heartbeat messages is detected as a result of a timeout in the SLP (action block 230), the SLP will activate backup call processors for all calls currently served by the call processor whose heartbeat message is missing (action block 232). The same action (action block 232) is performed if a threshold of allowable error rate is exceeded by a call processor. The most recent message is sent for all calls served by the failing call processor to the appropirate backup processors.

Figure 5:
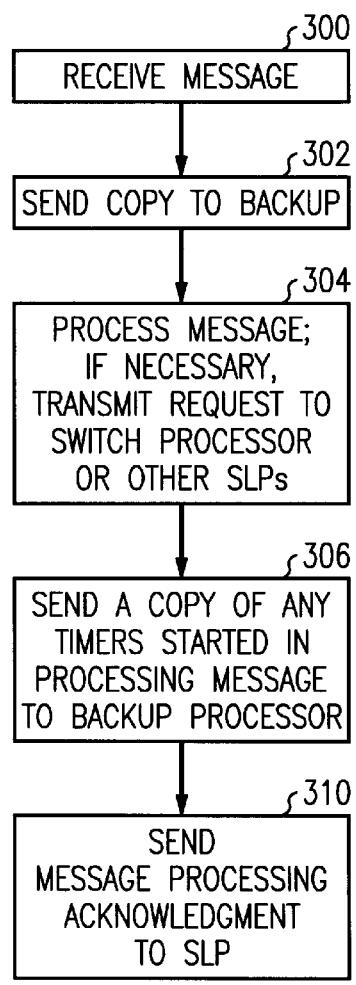

FIG. 5 is a flow diagram of actions performed in the call processor. A message is received (action block 300). A copy of the message is transmitted to the backup processor (action block 302). The SLP selects and informs the call processor of the identity of the backup processor at the time of the initial address message. The call processor then processes the message (action block 304). The processing of the message may, for example, require sending a request to a switch processor to establish a connection. The processing may also require sending a SS7 message for another trunk, such as an outgoing trunk, which message may be transmitted by a different signaling link processor. If the act of processing a message requires the activation of timers (for example, in case further information is requested from the caller), then a copy of any timer started in processing the message is also transmitted to the backup processor (action block 306). After the processing of the message is completed, an acknowledgement is sent to the signaling link processor (action block 310). Note that for the case of a request for additional information, or, in general, for some action requiring further timing, another message is expected, and so the processing has been completed for this message.

Figure 6:
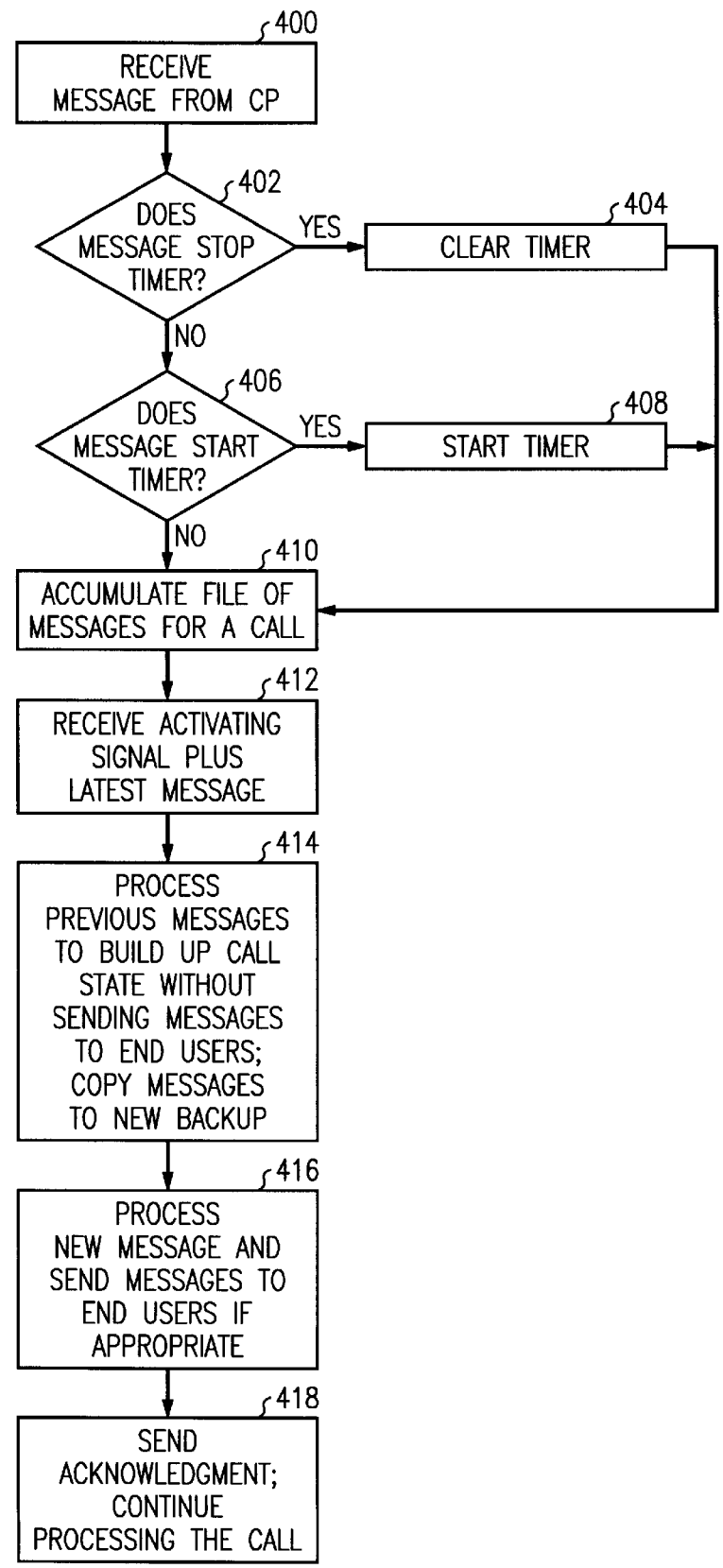

FIG. 6 is a flow diagram of actions performed in the backup CP. A backup CP receives a message from the call processor (action block 400). The backup CP tests whether the message stops a timer (test 402). If so, that timer is cleared (action block 404). If not, the backup CP tests whether the message starts a timer (test 406). If so, the timer is started (action block 408). If not, or following completion of either block 404 or block 408, the backup CP accumulates a file of messages and timer states for a call (action block 410). If the signaling link processor determines that the call processor has failed on this call, the SLP will transmit an activation signal plus the latest message to the backup CP received therein in action block 412. The backup CP will then process all previous messages to build up a call state (action block 414). The backup CP will do this processing without sending messages to end users or other switching systems. These messages have been previously successfully sent. The backup CP also copies the messages to a new backup processor (action block 414). The backup CP then processes the new message and sends messages to end users if appropriate (action block 416). The backup CP will then send an acknowledgement to the signaling link processor and continue processing the call (action block 418).

In an alternative arrangement, the SLP retains a copy of all messages for calls which have not yet been disconnected. The file of such messages is then sent from the SLP when the backup CP is activated for a call; this removes the necessity for sending messages to a backup CP for the high percentage of calls which are completed successfully. A disadvantage is that customer dialed inputs, especially those that are detected after initial dialing is complete, may not come through the signaling link processor, but would be stored if the backup CP approach were used.

In an alternative embodiment, the source of the backup CP activation message is a processor of the switch serving a trunk of the call. This switch processor maintains, in parallel with the signaling link processor, the identity of the designated backup processor for the call of each trunk. If the backup CP detects a timeout, it transmits a report to the switch processor. Heartbeat messages are sent to a switch processor, and failure of heartbeat is detected by that processor. Message processing acknowledgement messages are sent to the SLP; the SLP reports failure to receive such acknowledgement messages to the switching processor. The switching processor, in response to one of these indicators of failure of a CP, sends an activation message to the backup CP.

In another alternative embodiment, the switch processor is used for storing the messages of a call. This processor is also informed of customer dialed inputs. The disadvantage is that signaling messages are not otherwise required to be transmitted to the switch processor.

I claim:

1. In a telecommunications network, apparatus for providing reliable service for the control of the establishment of calls, comprising:

means for receiving interoffice signaling messages related to a call, and for transmitting the received messages to a call processor;

means for receiving interoffice signaling messages related to said call;

a plurality of at least three call processors responsive to receipt of interoffice signaling messages for controlling establishment of calls, one of said call processors for controlling establishment of said call, and another of said call processors designated as a backup processor for said call;

wherein said one call processor serves a plurality of calls and a plurality of processors serve as backup processors for different calls served by said one of said processors;

means for detecting failure of the one call processor and for activating said backup processor for said call;

means for transmitting only the stored interoffice signaling messages and not the call in process progress information to said backup processor;

said backup processor, responsive to being activated, for processing the interoffice signaling messages stored prior to a detection of a failure of said one call processor in order to build up a call state for said call;

said backup processor processing signaling messages received after the detection of said failure in order to continue the control of the establishment of said call;

wherein said backup processor processes interoffice signaling messages received prior to detection of said failure only if a failure is detected.

2. The apparatus of claim 1 wherein said network comprises other processors and wherein said plurality of call processors control establishment of calls by transmitting call control messages to said other processors.

3. The apparatus of claim 2 wherein said other processors comprise switching processors.

4. The apparatus of claim 3 wherein said means for storing received interoffice signaling messages related to said call comprise storage means in one of said switching processors.

5. The apparatus of claim 3 wherein said plurality of call processors and said switching processors are interconnected by a data network for transmitting call control messages.

6. The apparatus of claim 5 wherein said data network transmits ATM (asynchronous transfer mode) messages.

7. The apparatus of claim 1 wherein said means for receiving interoffice signaling messages related to a call comprises one of a plurality of SLPs (signaling link processors).

8. The apparatus of claim 7 wherein said means for storing received interoffice signaling messages related to said call comprise storage means in the one SLP.

9. The apparatus of claim 7 wherein said means for storing received interoffice signaling messages related to said call comprise storage means in said backup processor.

10. The apparatus of claim 1 wherein the one call processor generates heartbeat messages for reporting continuing operation of said one call processor and wherein said means for detecting failure comprises means for detecting absence of a heartbeat message.

11. The apparatus of claim 1 wherein the one call processor responds to receipt of an interoffice signaling message by transmitting an acknowledgement message after said one call processor has processed said interoffice signaling message, and wherein said means for detecting failure comprises means for detecting absence of an acknowledgment message.

12. The apparatus of claim 1 wherein said backup processor performs timing in response to receipt by the one call processor of one of a class of interoffice signaling messages requiring timing, and wherein said backup processor notified said means for detecting failure if the backup processor detects a timeout of the performed timing.

13. The apparatus of claim 1 wherein said means for detecting failure transmits an activation message to said backup processor when a failure is detected.

14. The apparatus of claim 1 wherein said means for detecting failure designates a new backup processor for said call when a failure is detected.

15. The apparatus of claim 2 wherein said backup processor processes interoffice signaling messages stored prior to said detection of a failure without transmitting call control messages to said other processors and processes interoffice signaling messages received after said detection of a failure including transmitting call control messages to said other processors.

16. In a telecommunications network comprising a plurality of at least three call processors, a method of providing reliable service for the control of establishment of calls, comprising the steps of:

receiving interoffice signaling messages related to a call, and transmitting the received messages to one of said call processors;

storing the received interoffice messages related to said call;

the one call processor, responsive to receipt of interoffice signaling messages related to said call, controlling establishment of said call;

designating another of said call processors as a backup processor for said call;

detecting failure of said one call processor;

responsive to said detecting failure, activating said backup processor for said call;

transmitting the stored interoffice signaling messages to said backup processor;

in said backup processor, responsive to being activated for said call, processing the interoffice signaling messages stored prior to a detection of a failure of said call processor in order to build up a call state for said call;

in said backup processor, processing interoffice signaling messages received after the detection of said failure in order to continue the control of the establishment of said call;

wherein said one call processor serves a plurality of calls and a plurality of different call processors serve as backup processors for calls served by said one processor;

wherein said backup processor processes interoffice signaling messages received prior to detection of said failure only if a failure is detected.

17. The method of claim 16 wherein said network comprises other processors; further comprising the step of transmitting call control messages to said other processors to control establishment of calls.

18. The method of claim 17 wherein said other processors comprise switching processors, and wherein the step of transmitting call control messages comprises transmitting call control messages to said switching processors.

19. The method of claim 18 wherein the step of storing received interoffice signaling messages related to said call comprises storing received interoffice signaling messages related to said call in one of said switching processors.

20. The method of claim 18 wherein said plurality of call processors and said switching processors are interconnected by a data network and wherein the step of transmitting call control messages to said switching processors comprises transmitting call control messages to said switching processors over said data network.

21. The method of claim 20 wherein said data network transmits ATM (asynchronous transfer mode) messages, and wherein the step of transmitting call control messages to said switching processors comprises the step of transmitting call control messages to said switching processors over said network by transmitting ATM messages.

22. The method of claim 16 wherein said network comprises a plurality of SLPs (signaling link processors) and wherein the step of receiving interoffice signaling messages related to a call comprises receiving interoffice signaling messages related to a call from one of a plurality of SLPs.

23. The method of claim 22 wherein the step of storing received interoffice office signaling messages related to said call comprises storing said received interoffice signaling messages related to a call in the one SLP.

24. The method of claim 22 wherein the step of storing received interoffice messages related to said call comprises storing received interoffice signaling messages related to said call in said backup processor.

25. The method of claim 16 further comprising the step of generating heartbeat messages for reporting continuing operation of said one call processor and wherein the step of detecting failure comprises detecting absence of a heartbeat message from said one call processor.

26. The method of claim 16 further comprising the step of responding to receipt of a signaling message in said one call processor by transmitting an acknowledgment message after said one call processor has processed said interoffice signaling message, and wherein the step of detecting failure comprises the step of detecting absence of an acknowledgment message.

27. The method of claim 16 further comprising the step of performing timing in said backup processor in response to receipt by the one call processor of one of a class of signaling messages requiring timing, and wherein the step of detecting failure comprises the step of detecting failure if the backup processor detects a timeout of the performed timing.

28. The method of claim 16 further comprising the step of:
responsive to detecting a failure, transmitting an activation message to said backup processor.

29. The method of claim 16 further comprising the step of:
responsive to detecting a failure, designating a new backup processor for said call.

30. The method of claim 17 wherein the step of processing interoffice signaling messages stored prior to said detection of a failure comprises processing such messages in said backup processor without transmitting call control messages to said other processors and wherein the step of processing interoffice signaling messages received after said detection of a failure includes the step of transmitting call control message to said other processors.

31. The apparatus of claim 1 wherein said backup processor for said call is a call processor for controlling establishment of other calls prior to being activated for said call.

32. The method of claim 16 wherein said backup processor for said call is a call processor for controlling establishment of other calls prior to being activated for said call.

* * * * *